June 6, 1961 P. HAURI 2,987,703

PRESET CODE RECEIVER FOR CENTRAL REMOTE-CONTROL SYSTEMS

Filed April 29, 1958 3 Sheets-Sheet 1

INVENTOR.
PAUL HAURI
BY
Morgan, Finnegan, Durham & Pine
ATTORNEYS.

INVENTOR.
PAUL HAURI
BY
Morgan, Finnegan, Durham & Pine
ATTORNEYS

June 6, 1961 P. HAURI 2,987,703

PRESET CODE RECEIVER FOR CENTRAL REMOTE-CONTROL SYSTEMS

Filed April 29, 1958 3 Sheets-Sheet 3

INVENTOR
Paul Hauri
BY
Morgan, Finnegan, Durham & Pine
ATTORNEYS

United States Patent Office 2,987,703

Patented June 6, 1961

2,987,703
PRESET CODE RECEIVER FOR CENTRAL REMOTE-CONTROL SYSTEMS

Paul Hauri, Zug, Switzerland, assignor to Landis & Gyr A.G., Zug, Switzerland, a corporation of Switzerland Filed Apr. 29, 1958, Ser. No. 731,779
Claims priority, application Switzerland May 9, 1957
8 Claims. (Cl. 340—164)

The present invention relates to central remote-control systems—otherwise known as loop control systems—which serve in known manner for transmitting orders from a control station over the electric power supply network to all outlets of the network, either for the rate setting of meters, or for turning off and on of appliances, such as boilers, furnaces, street lights, etc., or for controlling other switches.

In such systems, audio-frequency pulses are fed into the network by a transmitter at the control station, and the remote, controlled stations have receivers that respond to predetermined orders and execute the preassigned functions. Among the various known central remote-control systems, the commonest are based on time-interval techniques. In these, a series of order pulses is associated with a starting pulse on the time axis. The pulses are generally produced by a synchronous selector acting as generator, which acts upon the power transmission network to be controlled, through an audio-frequency transmitting system. The receivers are generally selectors operating synchronously with the network frequency, their electrically or mechanically controlled order contacts being arranged congruently with the contacts of the synchronous generator.

As part of such time-interval techniques, the use of groups of pulse combinations for special orders, in addition to the so-called direct orders in immediate synchronization, is well known.

Numerous devices in the receiving units have been proposed and developed for interpreting such pulse combinations, and are characterized either by an additional number of combination relays and corresponding complexity and multiformity of circuit diagram, or else, in so-called mechanical receivers, by gaining the ability to handle combination orders at the expense of elaborate and intricate wiring or complexity of design of the basic, or standard, receiver.

The present invention has for an object to provide a receiver using combination pulse orders avoiding the use of combination relays, and not requiring manifold wirings corresponding to the various "codes," and also not involving complication of the mechanical design of the standard receiver for direct orders. The invention has the further object of modifying a standard direct-order receiver by simple means for accomplishing interpretation of the numerous pulse-combination codes into control operations in a consistent manner.

The present invention accordingly relates to a remote-control receiver for central audio-frequency remote-control systems with network superposition—sometimes known as loop control systems—which receiver operates on the synchronous-selector principle wherein input circuit selective at the control frequency and a pulse relay associated therewith, with the aid of a synchronous selector, processes order pulses coordinated in time with a starting pulse into control operations, characterized in that there is provided a mechanical setting lock, comprising cams driven by the shaft of the synchronous selector, a setting lever actuated by a pulse relay and pivoted on a shaft, a pulse coding key in the form of a code insert movable relative to the lock, and a series contact in the main active current line of the control pulses, so that when control pulses coinciding with a selected coding key arrive from the network, the series contact is closed, thus releasing the main active current line for processing further incoming order pulses into control operations.

Figure 2:
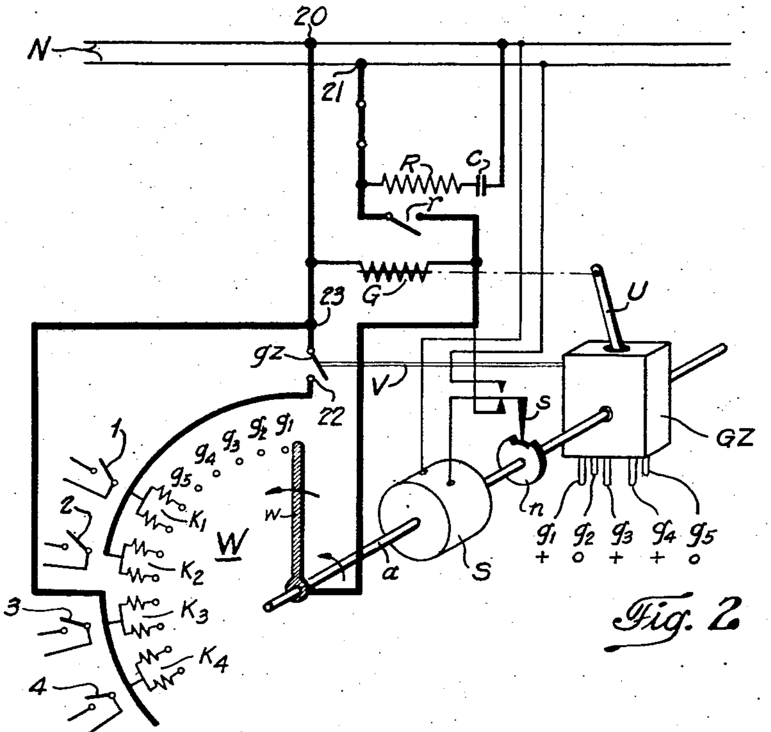
FIGURE 2 is a schematic view and wiring diagram of a known synchronous receiver to which the improvements of the present invention may be applied.
Figure 3:
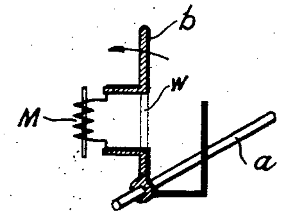
Figure 4:
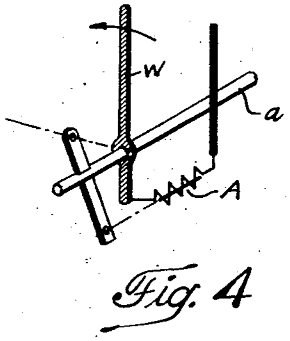
Figure 5:
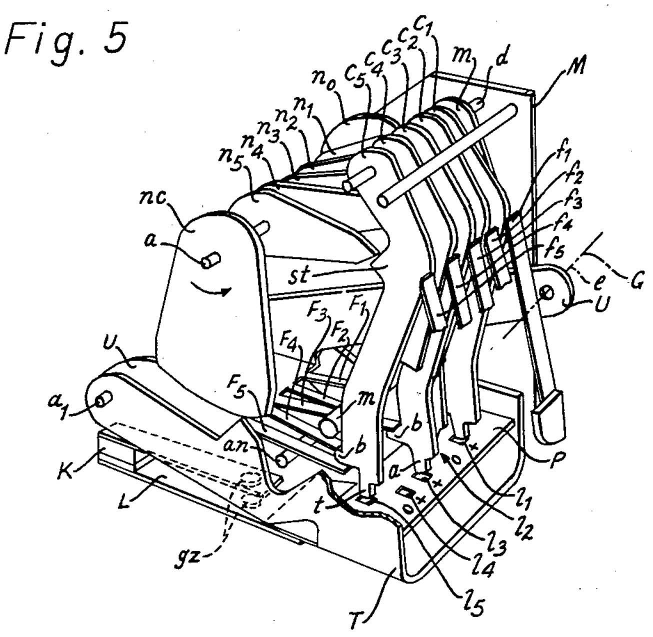
Figure 6:
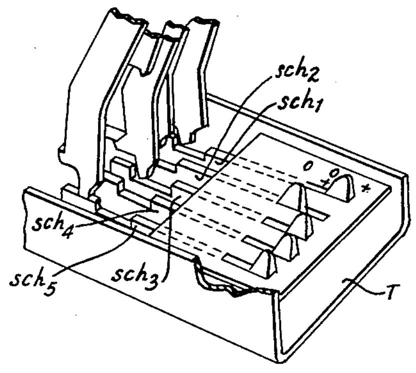
Figure 2A:
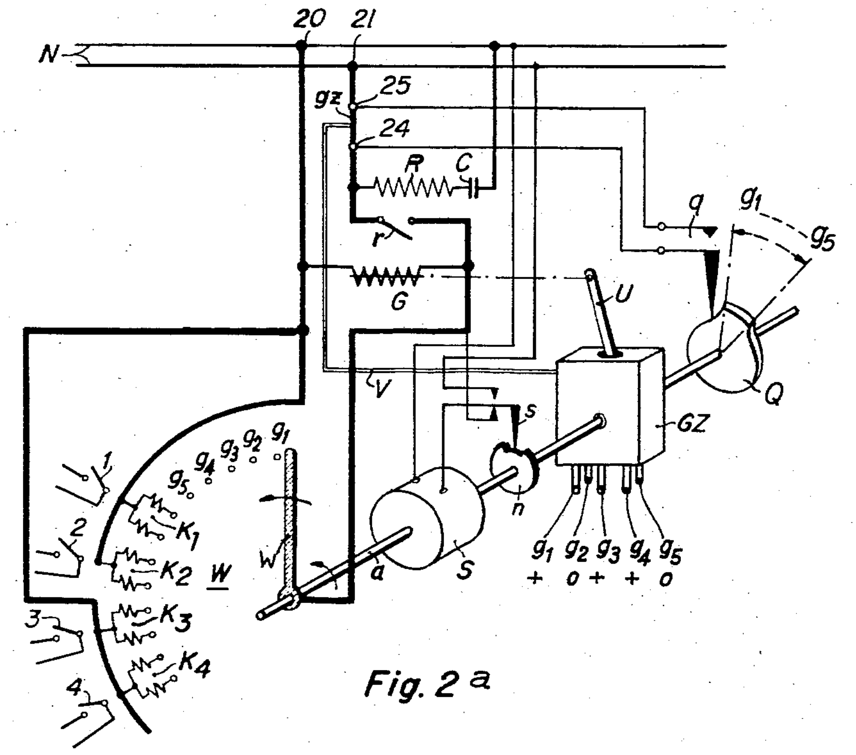

FIGURE 2*a* is a schematic view and wiring diagram of a modified embodiment of the invention;

FIGURE 3 is a modification of a portion of the structure shown in FIGURE 2;

FIGURE 4 is a further modification of a portion of the structure shown in FIGURE 2;

FIGURE 5 is a perspective view showing a preferred embodiment of the group attachment for use with the apparatus of FIGURE 2; and FIGURE 6 is a fragmentary perspective view of a modified embodiment of the attachment.

The invention will first be explained in its essentials with reference to FIGURES 1 and 2. FIGURE 2 shows a circuit diagram of a known synchronous receiver operating with electric trigger switches. The control pulses superposed on the network N are screened by a selective input circuit, relay R and capacitor C, tuned to the control frequency, so that, with the aid of a relay contact *r*, the main processing current line for the control pulse is keyed to actuate the control switches. Selective input circuits of various types are known, including for example those with amplifier elements, vibrators, etc. In the example of FIGURE 2, the inductance of the pulse relay R is itself a component of the selective input circuit, forming a series resonance circuit R, C tuned to the control frequency. The receiver functions in known manner, the synchronous motor S of the synchronous selector W being started by a starting pulse $s_0$, and the rotation being maintained for a full revolution with the aid of a cam *n* and associated contact *s*. The subsequently arriving control pulses then set up current pulses in the main processing current line, provided the latter is closed by the selector arm *w* and trigger relays $K_3$, $K_4$, . . . .

Figure 1:
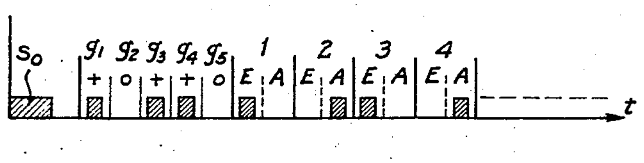
FIGURE 1 is a signal diagram.

FIGURE 1, by way of example, shows a pulse diagram, in which the first five unit pulses $g_1$, $g_2$, $g_3$, $g_4$ and $g_5$ are reserved for combination pulses. These combination pulses are moreover to be associated with two-way orders 1 and 2 having ON and OFF settings E and A respectively. Two-way commands 3, 4 . . . etc. are to serve for executing ordinary direct orders. The sign + means "pulse," the sign 0 means "no pulse." The five combination pulses admit of $2^5=32$ group combinations. As each group is to be associated with the first two two-way commands, we have $2\times32=64$ combination two-way commands plus the remaining direct commands 3, 4, . . . .

Now according to the present invention, a mechanical setting lock GZ is provided, coupled to the synchronous selector shaft *a*, the latter serving as time element for control cams located inside the lock. There is also a pulse relay G actuating a setting lever U for the group attachment GZ. As indicated in FIGURE 2, likewise schematically, the lock has a mechanical coding element corresponding to a preassigned desired pulse code $g_1$, $g_2$, $g_3$, $g_4$ and $g_5$, or, in the example of FIGURE 1, +0 + +0.

If the pulses corresponding to such a code reach the receiver, then pulse relay G actuates the setting lever U accordingly, whereupon, for the proper code, a movement of lever V occurs, closing the series contact *gz* in the main active current line and thus releasing control switches 1 and 2 for performing corresponding control operations. In the example of FIGURE 2, the sectors corresponding to the group pulses $g_1$, . . ., $g_5$ are open, or not carried out in practice.

The series contact $gz$ at locations 22, 23 may as such equally be placed at any point of the main processing current line for control pulses, shown heavy. However, if placed at locations 24, 25, as shown in FIGURE *2a* where the main processing current line is a component of the selective input circuit, the contact $gz$ must be bridged during passage of the combination group. This may advantageously be done, as shown in FIGURE *2a*, with the aid of a cam Q and associated contact $q$.

It is readily seen that it makes no material difference to the function and mode of operation of the group attachment according to the invention whether the receiver is of the type with electric order switches or of the type with mechanical switches. The latter are of known construction such that for example a relay M fixed to the selector arm $w$ and circuited in the main active current line actuates the synchronously coordinated switches mechanically by means of a pin $b$, as indicated in FIGURE 3, a variant detail of the structure shown in FIGURE 2. In other examples of mechanical receivers, a relay A circuited in the main active-current line effects an axial movement of the synchronous selector shaft $a$, whereupon the selector arm $w$ mechanically actuates the synchronously coordinated switches. In this case also, the group attachment described according to the invention may readily be used.

FIGURE 5 shows an illustrative and preferred embodiment of the group attachment according to the invention. The example is based on combination groups of 5 pulse elements. The details, however, apply analogously to any desired other number of elements. The group attachment is mounted in a casing M, only the back wall of which is shown in the figure, for the sake of clarity.

The shaft $a$ driven by the synchronous selector shaft bears fixed control cams $n_1, n_2, \ldots, n_5$. The actuating lever $e$ of the pulse relay G is merely indicated by a dot-dash line. It acts on the setting lever U, pivoted on a shaft $a_1$. A pulse coding key receptacle T with code insert P is arranged rotatably on the same shaft $a_1$.

The key receptacle T acts directly on the series contact $gz$, in the main active current line. Another shaft $d$ bears coding levers $c_1, c_2, \ldots, c_5$, pivotable against zeroing springs $f_1, f_2, \ldots, f_5$. The coding levers $c_1, c_2, \ldots, c_5$ are provided with teeth $st$, catches $b$ and lugs $ta$. Shaft $d$ also bears a pivotable zeroing lever $m$ actuated by the zeroing cam $n_0$ mounted on the synchronous shaft $a$. The code insert P in key receptacle T is provided with code slots $l_1, l_2, \ldots, l_5$. The key receptacle T in turn is pressed upward by a spring L. The key receptacle is retained against the spring action either by a code cam $n_c$ fixed on synchronous shaft $a$ or by coding levers $c_1, c_2, \ldots, c_5$. In FIGURE 5, the setting spring L of the key receptacle is made to serve as series contact $gz$ with the aid of a contact block K.

The mode of operation is as follows: Upon arrival of a control pulse pattern, for example, as in FIGURE 1, the synchronous selector is set in rotation in known manner by the starting pulse $s_0$. The synchronous shaft, $a$, coupled to the synchronous selector begins to rotate conformally. This makes the code cam $n_c$ depress the key receptacle T and makes the control cams $n_1, n_2, \ldots, n_5$, which are spaced or angularly staggered as seen in FIG. 5 according to the pulse interval divisions, rotate in coordination with the group pulses. In so doing, they successively swing coding levers $c_1, c_2, \ldots, c_5$, by means of teeth $st$, counterclockwise against springs $f_1, f_2, \ldots, f_5$. Thus the coding levers are deflected, one after the other, in synchronism with the successive time intervals, $g_1, g_2, \ldots, g_5$.

When a group pulse does arrive during these intervals an additional action occurs. The pulse relay G swings setting-lever U counterclockwise about shaft $a_1$ by means of lever $e$. This presses all the catch springs $F_1, F_2, \ldots, F_5$ upward. They are generally then stopped by the under sides of the catches $b$ of the coding levers. But if a coding lever has been deflected at the instant a group impulse arrives, then the corresponding spring F, deflected by the impulse, follows through to the upper edge of the catch $b$ of the coding lever and catches it from swinging back clockwise. FIGURE 5 shows this condition for the case where the group pulse $g_3$ has arrived, lever $c_3$ being stopped by spring $F_3$ from returning to its normal vertical position. The same applies to the group pulse $g_1$, and also to the group pulse $g_4$, but the latter's coding lever has been broken away in the figure for the sake of clarity.

It is thus seen that as each coding lever is being deflected one of two other actions occur. Either a group pulse $g_1, g_2 \ldots$, arrives at the time when a lever $C_1, C_2 \ldots$, is being deflected or no pulse is sent during this interval. If a pulse is sent then the associated coding lever is held in its deflected position by the action of the associated spring which is actuated in the presence of the pulse through the relay G and lever U. If the pulse is not sent, then lever U is not activated and the associated coding lever is allowed to return to its nominal position. Accordingly, the coding levers take up either of two positions in accordance with the transmission or suppression of the group pulses. The particular pulse combination shown in FIG. 1, $g_1$ "on," $g_2$ "off," $g_3$ "on," $g_4$ "on" and $g_5$ "off" is thus reflected in the position of the lugs $ta$ of the coding levers of FIG. 5: $C_1$ "on," $C_2$ "off," $C_3$ "on," $C_4$ "on" and $C_5$ "off." As noted below, if the coding levers take up positions according to the preset code, then switch $gz$ will be closed. If the proper group combination is not transmitted, then the lugs $ta$ of the coding levers will not be in their required positions and the closing of switch $gz$ will be prevented.

After completion of the combination pulse group, the code cam $n_c$ releases the key receptacle T thus providing a swinging movement of T in the counter-clockwise direction. If the code slots $l_1, l_2, \ldots, l_5$ of the insert P coincide with the positions of the lugs $ta$, then the key receptacle T will swing in far enough to close the series contact $gz$. If the position of the code slots does not coincide with that of the lugs, then the key receptacle is prevented from swinging in far enough to close contact $gz$. After a certain length of time, for example at the end of a selector revolution, the zero cam $n_0$ mounted on synchronous shaft, $a$, deflects the zeroing lever $m$, pivotal on shaft $d$, counterclockwise. The extension rod of the lever, also marked $m$ and located adjacent the coding levers, is seen in FIG. 5. This deflects all coding levers $c_1, c_2, \ldots, c_5$ so far that the springs retained on top of the catches $b$ drop back to the stop $an$. Then, together with the zeroing lever $m$, the coding levers drop back too, and the whole device is in zero position again.

In FIGURE 5, the code insert P is shown as a plate with the code corresponding to the example of FIGURE 1, +0 + +0. For a different code, the plate can be replaced accordingly. However, it is of particularly great advantage to be able to adjust the code pattern directly.

FIGURE 6 shows a modified example in which the code insert is equipped with displaceable slides $sch_1, sch_2, \ldots, sch_5$. It is apparent from the drawing that by pushing the slides to the right or left, any desired slot pattern for the coding levers can be selected. The position marked "0" corresponds to the "no pulse" state, and the position marked "+" corresponds to the "pulse" state. In between, an additional position $\overset{0}{+}$ is provided. In this position $\overset{0}{+}$, the code slot is so placed that the coding lever can get through in the "pulse" as well as in the "no pulse" state. This zero-plus position is useful in cases where partial mutual overlap is wanted for certain unlike groups.

Remote-control receivers equipped according to the invention with a setting lock in the form of a so-called group attachment as described afford great advantages. The group attachment in the form of the setting lock described is a compact, comparatively small unit, easily installed in any standard direct-order receiver, by simply coupling the synchronous shaft *a* to the synchronous selector shaft of the receiver and connecting the setting lever U to the pulse relay G with a lever *e*.

In FIGURES 1 and 5, a combination code of five group pulse elements is assumed. These permit $2^5=32$ goups, as described with reference to FIGURE 2, each associated with 2 two-way commands, so that the group attachment affords 64 combination two-way commands which, as described for the example of FIGURE 6, can be selected for each receiver at will by altering some slide settings. If for example the group were extended to 8 combination pulses, then $2^8=256$ groups would be possible. If these 256 groups were coordinated, such as explained with reference to FIGURE 2, with 5 two-way commands for example, that would make $5\times256=1280$ combination two-way commands. These 1280 two-way commands can very simply be selected as desired in any standard receiver equipped according to the invention with the group attachment described. The remaining direct-order two-way commands of the pulse program, not coordinated with the groups, are selected in known manner, for example by means of rotatable cam discs.

The receiver according to the invention, permitting larger numbers of orders and the coding of switch orders by economical and structurally simple means, extends the practice of the art of pulse combinations in time-interval techniques to broader and more comprehensive fields of application in network superposition than has been possible heretofore.

The invention in its broader aspects is not limited to the specific mechanisms shown and described but departures may be made therefrom within the scope of the accompanying claims without departing from the principles of the invention and without sacrificing its chief advantages.

What is claimed is:

1. Remote control receiver for central audio-frequency remote-control systems operating on the synchronous-selector principle wherein an input circuit selective at the control frequency and a pulse relay associated therewith, with the aid of a synchronous selector, processes order pulses coordinated in time with a starting pulse into control operations, in which there is provided a mechanical setting lock in the form of a group attachment which group attachment comprises control cams driven by the synchronous selector, a setting lever actuated by a pulse relay and pivoted on a shaft, a pulse coding key in the form of a code insert movable relative to the lock, and a series contact in the main active current line of the control pulses, actuated by the pulse coding key, so that when control pulses coinciding with a selector coding key arrive from the network, the series contact is closed, thus releasing the main active current line for processing subsequently arriving order pulses into control operations.

2. Remote-control receiver according to claim 1, in which the group attachment further comprises coding levers pivotable about a shaft against zeroing springs, and catch springs fixedly connected to the setting lever, whereby when control pulses arrive for the synchronously coordinated control cams, the setting lever actuated by the pulse relay makes the coding levers engage their catches, with the aid of the catch springs, in the positions deflected by the control cams.

3. Remote-control receiver according to claim 2, in which a zeroing lever pivotable on a shaft and a zero cam mounted on the synchronous selector shaft are provided, whereby in a certain final position of the synchronous selector, the coding levers, by a sufficient deflection, are released from the catch springs and returned to their common zero position.

4. Remote-control receiver according to claim 1, in which a key receptacle pivotable upon a shaft is provided for the coding insert, as well as a spring pressing the key receptacle against the coding levers.

5. Remote-control receiver according to claim 4, characterized in that the coding insert is provided with code slots, whereby when the key pattern coincides with the lock pattern of the coding levers, the key receptacle is pushed along far enough to close the series contact.

6. Remote-control receiver according to claim 5, characterized in that the coding insert is equipped with slides, such that a desired code pattern can be selected directly.

7. Remote-control receiver according to claim 6, characterized in that for each of the slides, an intermediate zero-position is provided in which the coding lever can enter the opening corresponding to zero-position of the slide whether or not a control pulse arrives.

8. Remote-control receiver according to claim 1, in which the synchronous selector shaft bears a code cam which, during actuation of the coding levers by the control cams, holds the key receptacle back against the spring.

References Cited in the file of this patent

UNITED STATES PATENTS

| | | |
|---|---|---|
| 2,203,358 | Koenig | June 4, 1940 |
| 2,229,097 | Koenig | Jan. 21, 1941 |
| 2,262,471 | Shoenberg | Nov. 11, 1941 |